Figure 1:
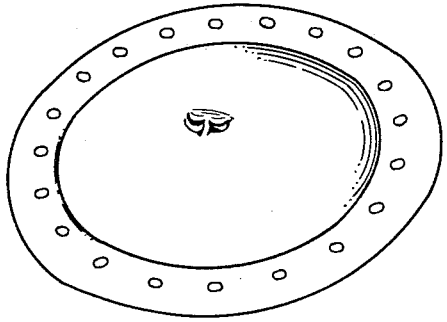

Sept. 20, 1960   G. DIEDRICH ET AL   2,952,867
PROCESS FOR THE PRODUCTION OF THERMOPLASTIC FILMS
Filed Nov. 23, 1956   2 Sheets-Sheet 1

INVENTORS
GEORG DIEDRICH
ERWIN GAUBE
KURT RICHARD
BY Connolly and Hutz
their ATTORNEYS

United States Patent Office 2,952,867
Patented Sept. 20, 1960

2,952,867
PROCESS FOR THE PRODUCTION OF THERMOPLASTIC FILMS

Georg Diedrich, Neuenhain, Taunus, Erwin Gaube, Kelsterbach am Main, and Kurt Richard, Bad Soden, Taunus, Germany, assignors to Farbwerke Hoechst Aktiengesellschaft vormals Meister Lucius & Bruning, Frankfurt am Main, Germany, a corporation of Germany Filed Nov. 23, 1956, Ser. No. 624,023

Claims priority, application Germany Dec. 1, 1955

12 Claims. (Cl. 18—1)

This invention relates to biaxially oriented thermoplastic films and to the method for their production.

It is known that plastic films can be improved in their strength properties by stretching in two directions. Several processes have been developed to accomplish this biaxial stretching, for example, biaxial drawing of the films which are gripped on both sides with sliding clamps as they come from a belting die, or inflation of a tube extruded through an annular die (film-blowing process), or by mechanical spreading and simultaneous drawing of the extruded tube. In all of these known processes, the following two essential points, which limit the increase in strength hitherto attained by biaxial stretching, should be kept in mind:

(1) At temperatures below the softening range, or, with crystallizing high polymers, below the crystallite melting point, only those materials in which the local reduction of area on extension (the so-called "necking") does not occur at all or only very slightly can be biaxially stretched. Otherwise, films of non-uniform thickness are obtained. The biaxial stretching attained in the case of such high polymers as exhibit necking in only a slight degree can be taken only to the point of stretching at which the aforementioned necking does not take place. The increases in strength attainable in this operation amount to at most 100% to 150%.

(2) At temperatures above the softening range or above the crystallite melting point, any desired degree of stretching whatever may be attained by means of the known processes since necking does not occur under these conditions. Of course, in this way only very slight increases in strength can be achieved. These increases in strength amount to about 50% only after stretching several hundred percent.

The previously known processes for production of strengthened plastic films are consequently only useful to a limited extent and exhibit considerable technical disadvantages.

A process which permits biaxial stretching of films beyond the necking at temperatures below the softening range or crystallite melting point is not yet known. On the other hand, stretching beyond the necking is generally used in fiber technology, and it is known, for example, in uniaxial orientation that the oriented fiber and tensile specimen may have up to 25 times the strength of the unoriented fiber.

It has now been found that thermoplastic films having biaxial orientation can be produced by heating a tubular section of thermoplastic orientable material at a temperature in the range between the crystallite melting point or softening point and about 60° C., preferably 30° C. thereunder, spherically expanding the heated section to effect orientation and subsequently cooling the oriented expanded section to set the orientation.

More specifically it has now been found that macromolecular thermoplastic materials can be oriented by stretching without these troubles and with good strengthening effect in all directions, by expanding a tube of the plastic material heated at a temperature in the range between the crystallite melting point (softening point) and 60° C., preferably 30° C., below this point at one end of the tube by application of internal pressure against the inside wall of the tube to the desired amount to form a larger tube and proceeding from the spherical transition between the tube and the larger tube a successive spherical inflation of the entire tube in about equal amounts is undertaken, whereupon the large film tube is guided through a hollow body. The guiding occurs suitably by a cylindrical sleeve which can be supplied simultaneously with a cooling mantle.

By carrying out the orientation beyond the necking, according to the invention, increases in strength are attained which have the same order of magnitude as the strengths of uniaxially oriented fibers. If the process of this invention be carried out at the crystallite melting point or at the softening point of the macromolecular material or slightly above it, care should be taken to see that the expansion proceeds rapidly and cooling of the large diameter tube of film is prompt.

The process of this invention may be carried out, for example, with plastics such as polyvinyl chloride, polytrifluorochloroethylene, and polyolefins, such as polyethylene, polypropylene, copolymers of olefins such as ethylene, propylene copolymers and with mixed polymers. It is especially advantageous to use the process of this invention for producing strengthened films made from low-pressure polyolefins, for example, such low-pressure polyolefins as those prepared according to Belgian Patents 533,362; 534,888; 540,459 and 538,782 of Karl Ziegler. It is advantageous in some cases to carry out further orientation in one direction by linear stretching at lower temperatures after the orientation in all directions according to the invention.

For a better understanding of the invention and for demonstrating its technical merits, the process of this invention may be described primarily on account of its simplicity in respect to the stretching of membranes. In the stretching by the process of this invention of tubular objects the same relationships are present so that the following particulars accordingly can be carried over to tube stretching. The accompanying drawings serve for further clarification.

Figure 2:
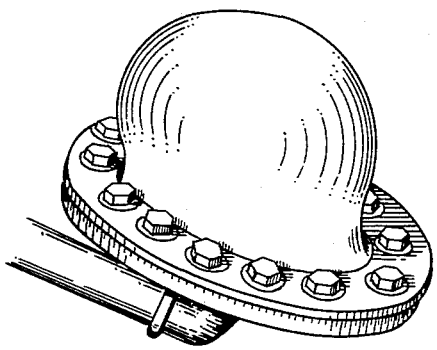
Figure 3:
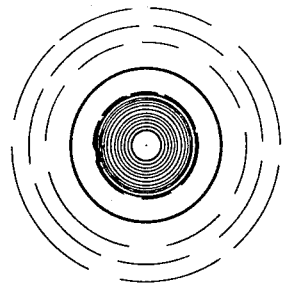
Figure 4:
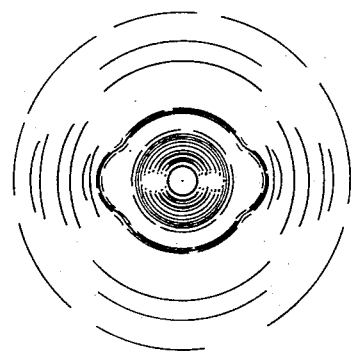
Figure 5:
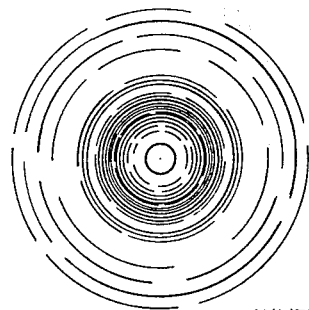
Figure 6:
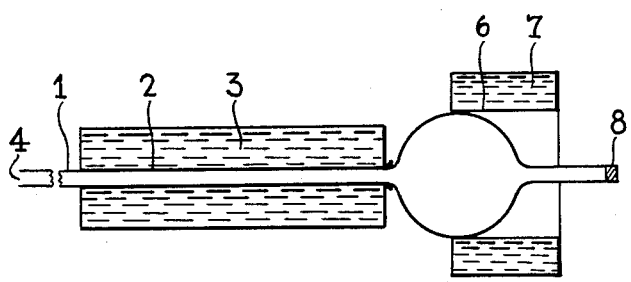
Figure 7:
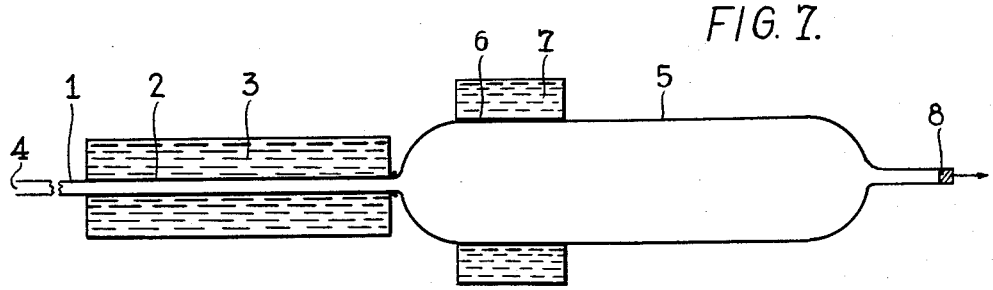

The acompanying drawing shows in Figures 1 and 2 the behavior of a membrane of polyethylene heated to different temperatures when being blown up by a fluid pressure applied to one side. Figures 3–5 show X-ray photographs of some polyolefin films having different degrees of orientation. Figures 6 and 7 show schematically the process for the manufacture of films oriented in all directions of their plane as described herein. Figure 6 shows the beginning of the inflating process, wherein a sphere is formed by inflating one end section of the tube which was heated to the temperature according to the invention. Figure 7 shows the same tube in a further stage of the process. The inflated zone has been extended by progressively and hemispherically inflating those parts of the tube which are immediately adjacent to the sphere formed in Figure 6.

The preparation of such a film from a membrane clearly demonstrates that the process for the desired orientation in all directions with the indicated increase in strength is possible only if the narrow temperature range which is favorable for the plastic in question is maintained. For example, if a membrane 2.5 mm. thick of low-pressure polyethylene (diameter=250 mm.) is subjected to a correspondingly high pressure at temperatures below the aforementioned suitable range, then the membrane at first expands until finally in the center a bubble is formed by uniaxial orientation and the membrane splits transversely to the stretching direction (cf. Figure 1 and X-ray photograph Figure 4).

However, if this experiment is carried out in the suitable temperature range mentioned (with low-pressure polyethylene at 100° to 130° according to the wall thickness), then the desired orientation in all directions of the membrane is obtained to form a spherical, high-strength film (see Figure 2) with thicknesses of, for example, 0.3 mm. to 0.01 mm. and strength values from a few hundred kg./sq. cm. up to about 3000 kg./sq. cm. in all directions. The strength attained depends on the expansion orientation temperature and the thickness of the films. The latter results from the initial thickness or from the degree of expansion. X-ray photographs represented in Figures 3 and 5 show that there is no preferential orientation in the plane of the film. Accordingly, the strength attained is equally great in all directions.

This ideal state of orientation occurs only in the case of spherical expansion of the membrane (a state of stress with two equal principal stresses). Accordingly, it may be carried over to continuous preparation of films from a tube if the tube as it comes from the extruder is spherically inflated and this spherical expansion is continued successively over the following tubing, during which operation the aforementioned temperature relationship must be maintained (see Figures 6 and 7). After attainment of the desired expansion, it is expedient to guide the tubing of film formed, for example, through a sleeve, and to cool it.

The process according to the invention differs from the film-blowing processes generally used as follows:

(1) In the film-blowing process, and extruded tube (about 2.5 meters long) is inflated along its entire length and essentially expanded in one direction (peripherally). In the procedure according to the invention it is prerequisite that a successive and spherical expansion takes place in order that the expansion is attained in all directions.

(2) In the film-blowing process, the shaping temperature is considerably above the crystallite melting point or softening range (for example, 170° with low-pressure polyethylene), and in the procedure according to the invention it is in the range from the crystallite melting point or softening point to about 60° C. below this point (for example, 125° with low-pressure polyethylene).

(3) In the film-blowing process in contrast to the process of this invention no necking occurs for the reasons cited under paragraph 2.

(4) An increase in strength does not take place in the film-blowing process at all, or only accidentally, but, in the process according to the invention, strength increases are attained which are of the same order of magnitude as those occurring in fiber orienting. The strengthening besides takes place in all directions.

(5) In the film-blowing process, the inflated tube is not guided, but, in the process according to the invention it is necessary to guide the tube after the expansion has taken place until it is cooled below the stretching orientation temperature or to cool it quickly to set the film in oriented state so that the set tube acts as a guide.

In Figures 6 and 7 is shown a sectional drawing of an apparatus used for carrying out the process of this invention which is not to be considered as limiting the invention in any way. A plastic tube 1 closed at the leading end 8 is led through a guide tube 2, made of copper and surrounded by a heating bath 3, and is thereby heated to the predetermined temperature for stretching in accordance with this invention and then by means of air pressure introduced by conduit 4 is expanded to a spherical shape in the region between the guide tube 2 and sleeve 6. The enlarged film tube 5 produced by the expansion is cooled in sleeve 6, which is provided with a cooling means 7, and is continuously drawn off at leading end 8.

It is to be understood that the stretching in all directions can also be carried out stepwise at various temperatures and that in place of a rigid cooling sleeve there may be a cooling annular stream of fluid to set the orientation.

*Example 1*

A membrane with a diameter of 250 mm. and a thickness of 2.5 mm. of low-pressure polyethylene was expanded spherically at 125° C. by compressed air (see Figure 2). The spherical section of film which was formed had a thickness of 0.1 mm. and a strength of 1500 kg./sq. cm. in all directions.

*Example 2*

A piece of tubing about 0.5 meter long of low-pressure polyethylene with an inside diameter of 25 mm. and a wall thickness of 2.5 mm. was heated to about 125° C. by immersion in a liquid glycol bath. When removed from the bath, the lower end remained immersed briefly so that the material was somewhat softer there than in the rest of the piece of tubing. By means of air pressure the lower, closed end of the tube was spherically inflated inside a sleeve with a diameter of 400 mm. As soon as the spherically inflated zone contacted the sleeve which was provided with a cooling system it was moved successively along over the entire length of the piece of tubing, cf. Figures 6 and 7. The transparent tube of film formed in this way had a thickness of about 22$\mu$ and a strength in all directions of 1500 kg./sq. cm.

*Example 3*

A tube of polypropylene closed at one end and open at the other with an outside diameter of 32 mm., a wall thickness of 3 mm. and a strength of 200 kg./cm.$^2$ was warmed in a heating apparatus corresponding to Figure 7 to 147° C. Thereupon, it was slowly extruded, closed end first, through the hot tube and blown up by internal pressure applied at the open end to contact a cooled sleeve of 300 mm. internal diameter. By regulation of the feeding velocity of the tube a hemispherical inflation results. The film tube so produced has in all directions almost equal tenacity and is, in contrast to a film tube produced by the normal blowing process, transparent. The finished film tube has a diameter of 300 mm. at a thickness of about 40$\mu$ and a strength in all directions of 1200 kg./cm.$^2$.

*Example 4*

In the same manner as in Examples 2 and 3 by hemispherical inflation at 120° C. of a tube of an ethylene-propylene copolymer was a transparent strengthened film produced. The strength of the tube was 150 kg./cm.$^2$, and the strength of the film about 1000 kg./cm.$^2$ in all directions.

What is claimed is:

1. A process for the production of thermoplastic film having multi-axial orientation which comprises heating a tubular section of crystallizable thermoplastic orientable material at a temperature in the range between the crystallite melting point and about 60° C. thereunder, spherically expanding said heated section by internal fluid pressure to effect orientation, and subsequently cooling the oriented expanded section to set the orientation, said cooling being effected in a confining means which prevents further radial expansion.

2. The process of claim 1 in which the heating temperature during expansion is in the range between the crystallite melting point and about 30° C. thereunder.

3. The process of claim 1 in which the thermoplastic material is a low-pressure polyethylene.

4. The process of claim 1 in which the thermoplastic material is low-pressure polypropylene.

5. The process of claim 1 in which the thermoplastic material is an ethylene-propylene copolymer.

6. The process of claim 1 in which the thermoplastic material is a mixture of low-pressure polyethylene and low-pressure polypropylene.

7. The process of claim 1 in which the spherical stretching is only partially completed and then the film is further stretched linearly at a lower temperature.

8. Apparatus for production of thermoplastic film having three dimensional orientation which comprises means for heating uniformly an annular section of a tube of orientable plastic in a heating zone, means for moving said heated tube out of said heating zone, means for creating a positive pressure within the tube to cause spherical expansion of said heated cross-section to take place, means for annularly cooling the spherically expanded tube at the point of tangency of the walls of the enlarged tube thus formed and the walls of the spherical section and means for moving said enlarged tube incrementally forward.

9. Process of claim 1 wherein the radial expansion of the tube is about ten times its original diameter.

10. A process for the manufacture of a film of a thermoplastic material, said film having multi-axial orientation, which comprises heating a tube of crystallizable thermoplastic orientable material at a temperature in the range between the crystallite melting point and about 60° C. thereunder, inflating one end section of the tube by internal fluid pressure to substantially spherical form, progressively hemispherically inflating the remainder of the tube by continuously extending the inflated zone over the entire tube length, and subsequently uniformly cooling the expanded tube around its circumference in order to set the orientation.

11. Process of claim 10 wherein the crystallizable thermoplastic material is a polymer of a monoolefin.

12. A process for the manufacture of a film of a thermoplastic material, said film having multi-axial orientation which comprises heating a tube of crystallizable thermoplastic orientable material at a temperature in the range between the crystallite melting point and about 60° C. thereunder, inflating one end section of the tube by internal fluid pressure to substantially spherical form, progressively hemispherically inflating the remainder of the tube by continuously extending the inflated zone over the entire tube length, and subsequently cooling the expanded tube in order to set the orientation, said cooling being effected in a confining means which prevents further expansion.

References Cited in the file of this patent

UNITED STATES PATENTS

| | | |
|---|---|---|
| 2,047,654 | Fischer | July 14, 1936 |
| 2,307,817 | Austin | Jan. 12, 1943 |
| 2,349,177 | Kopitke | May 16, 1944 |
| 2,541,249 | Hobson | Feb. 13, 1951 |
| 2,597,558 | Bailey | May 20, 1952 |
| 2,669,752 | Pratt | Feb. 20, 1954 |
| 2,753,596 | Bailey | July 10, 1956 |